(12) United States Patent
Csomo

(10) Patent No.: US 6,873,659 B2
(45) Date of Patent: Mar. 29, 2005

(54) TRANSMISSION SYSTEM WITH SPATIAL, TEMPORAL, AND FREQUENTIAL DIVERSITY

(75) Inventor: Jean-Francois Csomo, Montreuil-le-Gast (FR)

(73) Assignee: Itis, Cedex (FR)

( * ) Notice: Subject to any disclaimer, the term of this patent is extended or adjusted under 35 U.S.C. 154(b) by 700 days.

(21) Appl. No.: 09/737,381

(22) Filed: Dec. 14, 2000

(65) Prior Publication Data

US 2001/0006535 A1 Jul. 5, 2001

(30) Foreign Application Priority Data

Dec. 30, 1999 (FR) .............................................. 99 16747

(51) Int. Cl.$^7$ ................................................ H04B 1/66
(52) U.S. Cl. ........................... 375/240.27; 375/240.28; 348/425.2
(58) Field of Search ........................ 341/94; 348/425.2, 348/500; 375/240.27, 240.28

(56) References Cited

U.S. PATENT DOCUMENTS

| 6,091,717 A | * | 7/2000 | Honkasalo et al. | ......... 370/329 |
| 6,356,771 B1 | * | 3/2002 | Dent | ....................... 455/562.1 |
| 6,483,834 B1 | * | 11/2002 | Salisbury | ................. 370/395.2 |

FOREIGN PATENT DOCUMENTS

| EP | 0708543 A1 | 4/1996 |
| EP | 0929161 A2 | 7/1999 |
| WO | WO9914871 | 3/1999 |

OTHER PUBLICATIONS

XP–002147053 Subcarrier–Based Selection Diversity Receeptionof DVB–T in a Mobile Environment, Jukka Rinne, Gateway to 21$^{st}$ Century Communications Village. VTC 1999–Fall. IEEE VTS 50$^{th}$ Vehicular Technology Conference.

* cited by examiner

*Primary Examiner*—Jeffery Hofsass
*Assistant Examiner*—George A Bugg
(74) *Attorney, Agent, or Firm*—Tarolli, Sundheim, Covell & Tummino L.L.P.

(57) ABSTRACT

The invention relates to digital signal terrestrial transmission systems operating in accordance with the MPEG2-TS standard and the DVB-T standard.

The system comprises:
  N transmitters (12, 14) or transmission channels operating respectively at N different frequencies F1 to FN, each transmitter receiving a same digital signal to send in the form of packets in accordance with the MPEG2-TS standard,
  N receivers (22R, 24R) or receiving channels operating respectively at N frequencies F1 to FN, each receiver supplying a succession of packets in accordance with the MPEG2-TS standard,
  N error detection devices (22E, 24E) for detecting errors in the packets supplied by each receiver,
  N synchronization devices (22S, 24S) for synchronizing the packets supplied by each receiver, and
  a device for selecting one packet among the N available packets that does not contain an error or, failing that, a packet that corresponds to the lowest error rate.

8 Claims, 2 Drawing Sheets

TRANSMISSION SYSTEM WITH SPATIAL, TEMPORAL, AND FREQUENTIAL DIVERSITY

The present invention relates to digital signal terrestrial transmission systems conforming to the MPEG2-TS and DVB-T standards.

Transmission systems of the above type are implemented to overcome some drawbacks arising from Gaussian noise, multiple propagation paths between the transmitter and receiver, interference between adjacent channels, etc . . . .

However, these systems fail to offer good transmission performance for transmitters and receivers which are mobile or located in poor propagation environments.

An object of the present invention is thus to provide a digital signal terrestrial transmission system that allows transmission between mobile transmitters and/or receivers. This system is more particularly suited to digital signals conforming to the MPEG2-TS standard and conveying information for synchronization according to the TS 101 191 standard.

To this end, the invention relates to a system implementing a spatial and/or frequential and/or temporal diversity in which there are provided, at the receiving end of the digital signals, means for selecting error-free digital signals or, failing that, digital signals which correspond to a transmission having the lowest error rate.

More particularly, the invention relates to a system for the terrestrial transmission of digital signals in accordance with the MPEG2-TS and DVB-T standard and carrying information for synchronization in accordance with the TS 101 191 standard, characterized in that it comprises at least:

N transmitters or transmission channels operating respectively at N different frequencies F1 to FN, each transmitter receiving a same digital signal to send in the form of packets in accordance with the MPEG2-TS standard, N receivers or receiving channels operating respectively at N frequencies F1 to FN, each receiver supplying a succession of packets in accordance with the MPEG2-TS standard, N error detection devices for detecting errors in the packets supplied by each receiver, N synchronization devices for synchronizing the packets supplied by each receiver, and a device for selecting one packet among the N available packets that does not contain an error or, failing that, a packet that corresponds to the lowest error rate.

The N transmission antennas can be located at geographically spaced apart locations, and likewise for the P receiving antennas, so introducing a spatial diversity.

To introduce a temporal diversity, each transmission channel comprises a device for time shifting the packets of one channel relative to another, and each receiving channel comprises a synchronization device for the temporal repositioning of the packets received on each channel.

The time shifting and repositioning of the packets are obtained e.g. by means of FIFO type buffer memories. At the transmission end, the buffer memories serve to produce a calibrated delay and, at the receiving end, they serve to align the start of the megaframes of each receiving channel irrespective of the delay introduced by the temporal diversity at the transmission end.

In order to identify the start of a megaframe, the system can set to logic level 1 a ninth bit of the first octet (byte) of the first packet of the megaframe.

For the selection among the packets available at the output of the buffer memories, the invention can set to logic level 1 a ninth bit of the last octet (byte) of the packet preceding any error-containing packet so that this error-containing packet is not selected for reading.

In the event that the available packets at a same instant all contain an error, the invention provides means for selecting the packet corresponding to the receiving channel having the lowest error rate.

Other characteristics and advantages of the present invention shall become apparent upon reading the following description of an embodiment with reference to the appended drawings in which.

Figure 1:
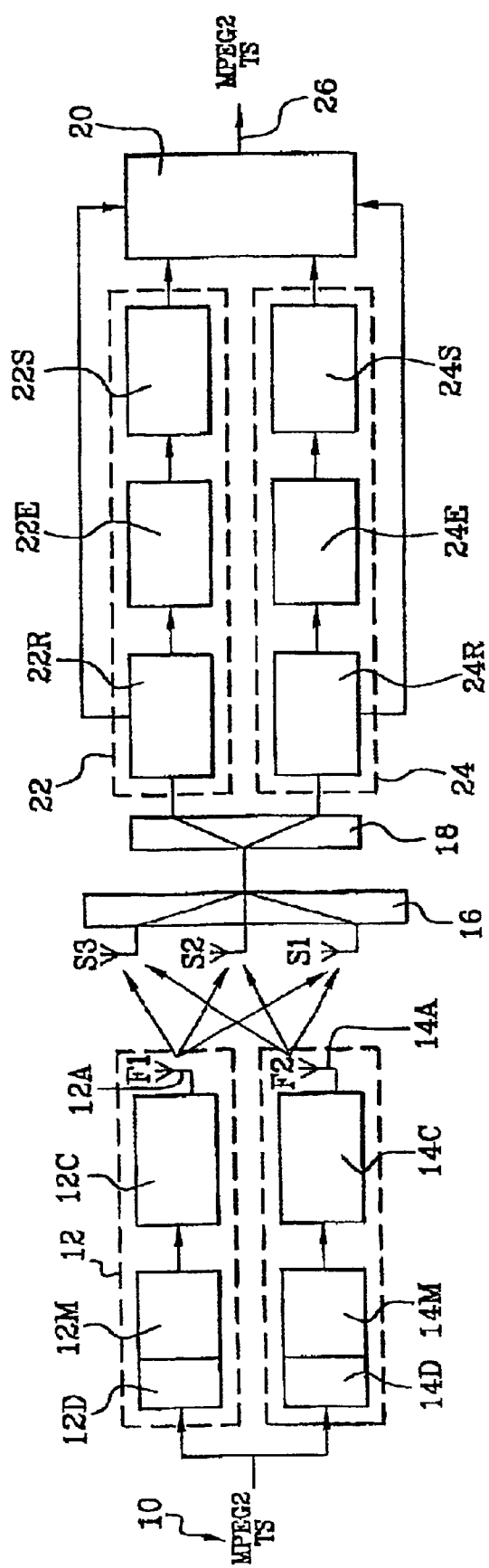
FIG. 1 is a block diagram of a digital signal terrestrial transmission system in accordance with the invention.

The invention shall be described for the particular case in which a spatial diversity is limited to N=2 frequencies, F1 and F2, a temporal diversity limited to N=2 delay values T1, T2, and a spatial diversity of N=2 transmission antennas and P=3 receiving antennas.

The digital signals 10 to be transmitted by a terrestrial transmission network are compliant to the MPEG2-TS standard and comprise synchronization information in accordance with the TS 101 191 standard.

According to the invention, these signals are applied simultaneously to two transmission channels 12 and 14. Each transmission device 12 (or 14) comprises a delay circuit 12D (or 14D) introducing a delay T1 (or T2), a COFDM (coded orthogonal frequency division multiplex) modulator 12M (or 14M), a frequency changing and amplification circuit 12C (or 14C) whose central frequency is F1 (or F2) and a transmitting antenna 12A (or 14A) radiating to the network's receiving antennas. Antennas 12A and 14A can be located at geographically different locations to create a first spatial diversity.

The P=3 receiving antennas S1, S2, and S3 receive signals from each of the antennas 14A and 14B, and the detected signals are combined in a combining circuit 16. The combined signals are applied to a separator circuit 18 which distributes the combined signals to the receiving devices 22 and 24.

Each receiving device 22 (or 24) comprises a receiver 22R (or 24R) for receiving COFDM type signals, which produces digital signals at its output, an error detection circuit 22E (or 24E) and a synchronization circuit 22S (or 24S).

The digital signals at the output of the synchronization circuits 22S or 24S are mutually synchronized, i.e. the delays T1 and T2 and any other shift are brought to zero, and are applied to a selection circuit 20 which selects the digital signals coming from the receiving channel having no errors or, failing that, the receiving channel having the lowest error rate. This error rate of each channel is measured by the receiver 22R (or 24R). The output of the selection circuit 20 supplies the digital signals 26 according to the MPEG2-TS standard, which corresponds to the digital signals 10 at the input of the transmission channels.

The delays T1 and T2 are introduced in the digital signals compliant to the MPEG2-TS standard using e.g. one buffer memory per transmission channel. Each buffer memory has e.g. a capacity to contain M packets according to the MPEG2-TS standard, each packet containing 188 to 204 octets (bytes).

Generally speaking, for the case of N transmission channels, there are N delays T1, ..., Ti, ... TN, where Ti is the delay of the channel having rank i.

Each memory operates in the FIFO (first in, first out) mode, according to which the first packet recorded shall be the first to be read, with a time delay T1 (or T2). Time delay T1 can be zero, i.e. no buffer memory is used, while time delay T2 should at least be equal to the time period of 25 packets. If a third transmission channel were used, the delay T3 should then be at least equal to 50 packets relative to the first channel, and to 25 packets relative to the second channel.

This delay value of 25 packets between two consecutive transmission channels is obtained by taking into account the maximum depth of interleaving produced in the case of a system operating in the so-called (8K, 64 QAM) mode of the MPEG2-TS standard.

For different modes, the delay between two transmission channels can be less than 25 packets.

At the receiving end, the digital signals which are time shifted owing to the delays T1, T2 and all the other time delays must be resynchronized to enable the selection of the error free digital signals in one receiving channel or the other or, failing that, the signals of the receiving channel having the lowest error rate.

This synchronization is obtained using a buffer memory in each receiving device, the buffer memory operating in the FIFO mode.

This synchronization uses to advantage the characteristics of the TS 101 191 standard which defines the composition of a frame, known as a megaframe, comprising n packets, where n depends on the mode used, for example the 64QAM or 16QAM mode. The megaframe contains a megaframe initialization packet (MIP).

Figure 3:
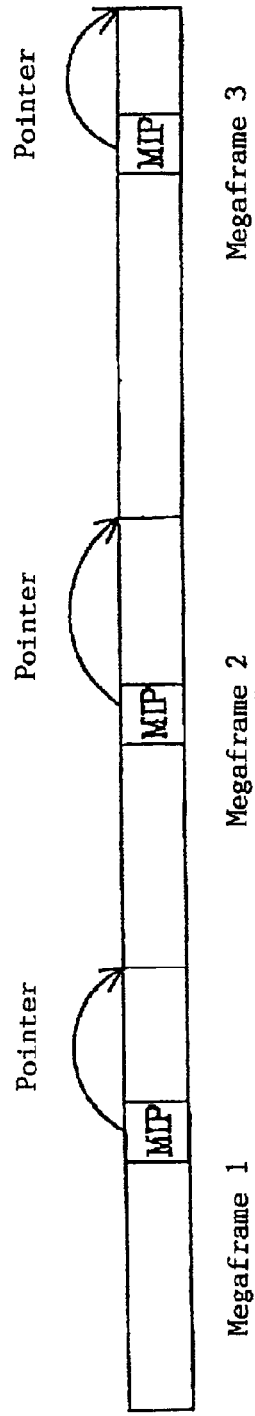
FIG. 3 is a diagram showing a series of three megaframes each comprising an MIP packet.

This MIP packet contains a certain number of items of information, including a 16-bit "pointer" which indicates the number of packets between the MIP packet and the start of the next megaframe (FIG. 3).

Each packet also contains a transport error indicator which, when in logic state 1, indicates the presence of at least one non-corrected bit error. These two items of information, i.e. from the pointer and the transport error indicator, are used to advantage in implementing the invention.

Figure 2:
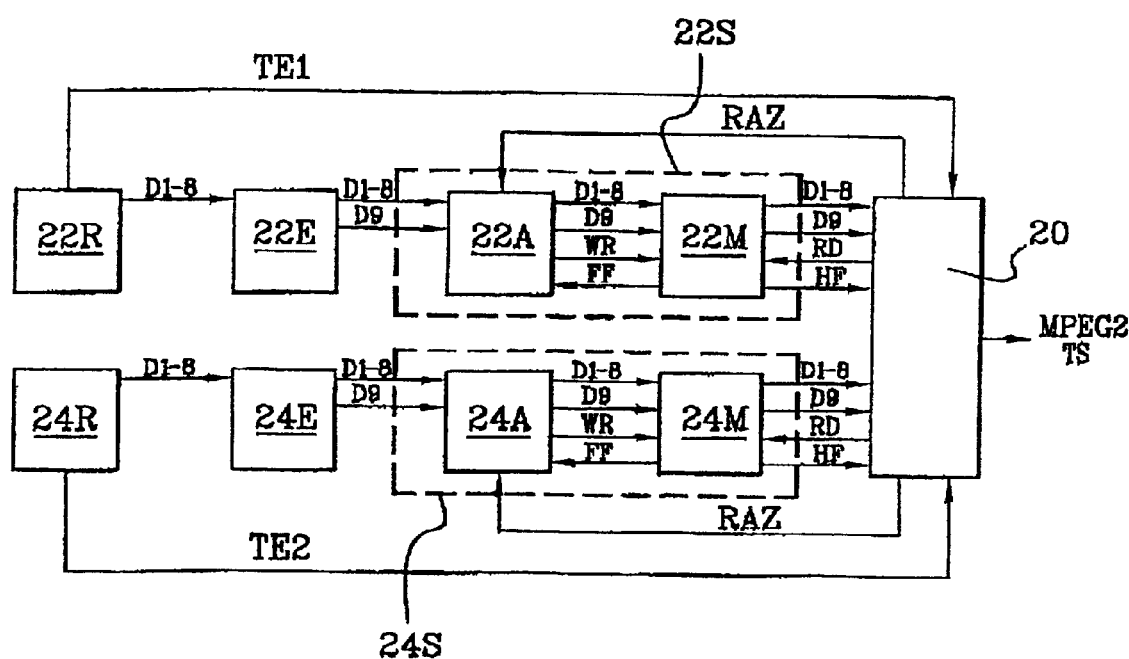
FIG. 2 is a block diagram illustrating the mechanism for selecting digital signals upon reception as a function of the measured error rate.

As shown in FIG. 2, the MPEG2-TS packets on each receiving channel are applied to the corresponding error detection circuit 22E or 24E. This circuit analyzes the error indicator of each packet and its function is to set to 1 a ninth bit D9 for the last octet of all packets that precede an error-containing packet. By virtue of this forward shift of that error information, the ninth bit D9 of the last octet of a packet can be analyzed to determine whether or not there is an error in the following packet.

In order to produce such a shift, the circuit 22E or 24E comprises registers for storing several consecutive octets.

Note that the ninth bit of octets other than the last octet of a packet are not taken into account and can thus take on any value, 0 or 1, except as concerns the first octet of the first packet of a megaframe, as explained above.

The packets supplied by circuits 22E and 24E are each applied respectively to the synchronization circuits 22S and 24S which each comprise a FIFO type memory 22M or 24M and a find and write circuit 22A and 24A.

Each of the circuits 22A or 24A has the function of finding the MIP packets, and to read therein a pointer indicating the start of the following megaframe. This information from the pointer allows the circuit to locate the start of the following megaframe and thus to set the ninth bit D9 to 1 for the first octet of the first packet of the megaframe.

Once the above location and setting is achieved, the first packet of the megaframe is recorded (signal WR) in the memory 22M or 24M, and then the following packets are recorded. When the memories 22M or 24M are both half full, as indicated by an indicator (HF signal), the latter can be read (signal RD) and the selection of the packet retained by the selection circuit 20 is carried out as a function of error bit of the last octet of the preceding packet so as to select an error free packet.

However, this reading of the memories 22M or 24M does not take place if the ninth bit of the first octet of the megaframe in each memory is not set to 1, for this means that the two megaframes are not synchronized. In this case, the circuits 22A and 24A are restarted to find the start of a new megaframe in each channel. In this case, circuit 20 sends to the two find and write circuits 22A and 24A a reset to zero signal (RAZ) to start a search for the following megaframe.

It may happen that one of the two memories 22M and 24M becomes full owing to the fact that the writing into these memories does not start on the same megaframe. In this case, the full memory supplies an indicator FF signal which restarts the circuit 22A or 24A for finding a megaframe.

It may happen that the two packets which can be read in the memories 22M and 24M contain errors. In this case, the selection circuit 20 selects the packet from the channel having the lowest error rate. This information on the error rates TE1 and TE2 is supplied respectively by receivers 22R and 24R.

The invention has been described with reference to a specific embodiment with N=2 transmitters and receivers, two transmission antennas and N=3 receiving antennas at different geographical locations. However, it can apply to a system comprising a multiplicity of transmitters and receivers at different frequencies.

Moreover, the time shifts at the transmission end have been described as being obtained using FIFO type buffer memories, but other devices can be used for that purpose.

The same applies for the temporal realignments or synchronization at the receiving end, which are obtained by FIFO type buffer memories.

The process which consists of adding a ninth bit D9 to the octets of the packets to indicate, in the last octet of a packet, whether the following packet has an erroneous value or not, or in the first octet of a packet, the start of a megaframe, can also be replaced by any other process without departing from the scope of the invention.

What is claimed is:

1. System for the terrestrial transmission of digital signals in accordance with the MPEG2-TS and DVB-T standard and carrying information for synchronization in accordance with the TS 101 191 standard, comprising:

N transmitters, where N is an integer greater than one, operating respectively at N different frequencies, each transmitter receiving a same digital signal to send in the form of packets in accordance with the MPEG2-TS standard;

N receivers operating respectively at N frequencies, each receiver supplying a succession of packets in accordance with the MPEG2-TS standard;

N error detection devices for detecting errors in the packets supplied by each receiver;

N synchronization devices for synchronizing the packets supplied by each receiver; and a device for selecting one packet among the N available packets that corresponds to the lowest error rate.

2. System according to claim 1, including N transmission antennas located at different positions and each receiving an output signal from one of the N transmitters.

3. System according to claim 1 including P receiving antennas, where P is an integer greater than one, which are located at different positions, a device for combining signals received by the P antennas to supply a combined signal, and a device for distributing the combined signal among the N receivers.

4. System according to claim 1, further comprising:

N time shifting devices associated with respective transmitters for time shifting a digital signal received by its associated transmitter, the time shift being different for each transmitter; and N devices associated with respective receivers for timewise realigning digital signals supplied by the N receivers.

5. System according to claim 4, wherein a given time shifting device comprises a buffer memory in which the digital signals are stored at an instant "t", said digital signals being read at instants (t+Ti) for signals applied to the transmitter of rank i among N.

6. System for the terrestrial transmission of digital signals in accordance with the MPEG2-TS and DVB-T standard and carrying information for synchronization in accordance with the TS 101 191 standard, comprising:

N transmitters, where N is an integer greater than one, operating respectively at N different frequencies, each transmitter receiving a same digital signal to send in the form of packets in accordance with the MPEG2-TS standard and comprising a device for applying a time shift to the digital signal, the time shift being different at each transmitter;

N receivers operating respectively at N frequencies, each receiver supplying a succession of packets in accordance with the MPEG2-TS standard and comprising a device for timewise realigning digital signals; and N error detection devices for detecting errors in the packets supplied by each receiver;

N synchronization devices for synchronizing the packets supplied by each receiver; and a device for selecting one packet among the N available packets that corresponds to the lowest error rate;

wherein the timewise realigning device comprises a circuit for detecting the start of each megaframe, a buffer memory in which the packets are stored, beginning from the detection of the start of each megaframe, each packet having associated therewith error information supplied by the error detection device, and a circuit for selecting one of the buffer memories so as to select a packet corresponding to the receiving channel having the lowest error rate.

7. System according to claim 6, wherein said circuit for detecting the start of each megaframe comprises:

means for reading in a packet a pointer indicating the start of the following megaframe, and means for adding in the first octet of the megafrane a ninth bit indicating the start of said megaframe.

8. System for the terrestrial transmission of digital signals in accordance with the MPEG2-TS and DVB-T standard and carrying information for synchronization in accordance with the TS 101 191 standard, comprising:

N transmitters, where N is an integer greater than one, operating respectively at N different frequencies, each transmitter receiving a same digital signal to send in the form of packets in accordance with the MPEG2-TS standard;

N receivers operating respectively at N frequencies, each receiver supplying a succession of packets in accordance with the MPEG2-TS standard;

N error detection devices for detecting errors in the packets supplied by each receiver;

N synchronization devices for synchronizing the packets supplied by each receiver; and a device for selecting one packet among the N available packets that corresponds to the lowest error rate, said device comprising means for detecting the error indicator in each packet and means for adding a ninth bit in the last octet of a packet preceding all error-containing packets, said ninth bit constituting an error indicator for a following packet.

* * * * *

UNITED STATES PATENT AND TRADEMARK OFFICE
CERTIFICATE OF CORRECTION

PATENT NO. : 6,873,659 B2
DATED : March 29, 2005
INVENTOR(S) : Jean-Francois Csomo It is certified that error appears in the above-identified patent and that said Letters Patent is hereby corrected as shown below:

Column 6,
Line 17, after "the (2$^{nd}$ occurrence)" change "megafrane" to -- megaframe --.

Signed and Sealed this

Twelfth Day of July, 2005

JON W. DUDAS
*Director of the United States Patent and Trademark Office*